United States Patent
Oh et al.

(10) Patent No.: US 8,885,790 B2
(45) Date of Patent: Nov. 11, 2014

(54) REVERSE CONICAL LOWER END PLUG FOR AN ANNULAR NUCLEAR FUEL ROD

(71) Applicants: Korea Atomic Energy Research Institute, Daejeon (KR); Korea Hydro and Nuclear Power Co., Ltd, Seoul (KR)

(72) Inventors: Dong seok Oh, Daejeon (KR); Tae hyun Chun, Daejeon (KR); Wang kee In, Daejeon (KR); Chang hwan Shin, Gyeonggi-do (KR); Hyung kyu Kim, Daejeon (KR); Young ho Lee, Daejeon (KR); Kyung-Ho Yoon, Daejeon (KR); Kang-Hee Lee, Daejeon (KR); Jae-Yong Kim, Daejeon (KR); Kun woo Song, Daejeon (KR)

(73) Assignees: Korea Atomic Energy Research Institute, Daejeon (KR); Korea Hydro and Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 13/871,475

(22) Filed: Apr. 26, 2013

(65) Prior Publication Data

US 2013/0259188 A1    Oct. 3, 2013

Related U.S. Application Data

(63) Continuation of application No. 12/345,452, filed on Dec. 29, 2008, now abandoned.

(30) Foreign Application Priority Data

Jul. 4, 2008    (KR) .......................... 10-2008-0064872

(51) Int. Cl.
    *G21C 3/00*     (2006.01)
    *G21C 3/322*    (2006.01)
    *G21C 3/10*     (2006.01)

(52) U.S. Cl.
    CPC . *G21C 3/10* (2013.01); *Y02E 30/38* (2013.01); *G21C 3/322* (2013.01)
    USPC .......................................................... 376/409

(58) Field of Classification Search
    CPC ........... Y02E 30/38; G21C 3/322; G21C 3/00
    USPC ........................................................ 376/409
    See application file for complete search history.

(56) References Cited

U.S. PATENT DOCUMENTS

| 3,132,076 A | * | 5/1964 | West et al. | ..................... 376/351 |
| 4,675,154 A | | 6/1987 | Nelson et al. | |

(Continued)

OTHER PUBLICATIONS

Cimbala, John et al., "Mass, Bernoulli, and Energy Equations," Essentials of Fluid Mechanics: Fundamentals and Applications w/ Student Resource DVD, 1st Edition, Chapter 5, pp. 171-226, McGraw-Hill Higher Education, (2006).

*Primary Examiner* — Frank J McGue
(74) *Attorney, Agent, or Firm* — Nelson Mullins Riley & Scarborough LLP; John S. Curran (57) ABSTRACT

A lower end plug for an annular nuclear fuel rod includes a support with a great slenderness ratio, a coolant inflow part with an inner inflow space and a plurality of inflow holes in a wall thereof so as to interact with the inflow space, coupled to a lower end of the annular nuclear fuel rod at an upper end thereof, and extending from an upper end of the support in a reverse conical shape such that the inflow space interact with an inner channel of the annular nuclear fuel rod, and a coupler extending from a lower end of the support and coupled with a handing tool of the annular nuclear fuel rod. Thus, although a bottoming phenomenon of the annular nuclear fuel rod occurs, the coolant can be supplied to the inner channel of the annular nuclear fuel rod through the inflow holes of the lower end plug.

2 Claims, 10 Drawing Sheets

(56) References Cited

U.S. PATENT DOCUMENTS

| | | |
|---|---|---|
| 4,828,791 A | 5/1989 | DeMario |
| 4,865,804 A | 9/1989 | McGeary et al. |
| 5,158,740 A | 10/1992 | Boatwright |
| 5,663,993 A | 9/1997 | Danielson et al. |
| 8,520,795 B2 * | 8/2013 | Yoon et al. .................... 376/451 |
| 2004/0151273 A1 * | 8/2004 | Lahoda ......................... 376/211 |
| 2008/0013667 A1 | 1/2008 | Oh et al. |

* cited by examiner

FIG. 1

PRIOR ART

REVERSE CONICAL LOWER END PLUG FOR AN ANNULAR NUCLEAR FUEL ROD

CROSS-REFERENCE TO RELATED PATENT APPLICATION

This application is a continuation of U.S. application Ser. No. 12/345,452, filed on Dec. 29, 2008, which claims priority to, and the benefit of, Korean Patent Application No. 10-2008-0064872, filed on Jul. 4, 2008, in the Korean Intellectual Property Office, the disclosure of which is incorporated herein in its entirety by reference.

BACKGROUND OF THE INVENTION

1. Field of the Invention

The present invention relates, in general, to the lower end plug for an annular nuclear fuel rod and, more particularly, to a lower end plug, which plugs up the lower portion of an annular nuclear fuel rod so as to prevent the fusion gas filled between the cladding tubes of the annular nuclear fuel rod from leaking out.

2. Description of the Related Art

A nuclear fuel assembly is composed of a plurality of nuclear fuel rods. The conventional fuel rod has cylindrical type, in each of which a uranium sintered pellet (or a cylindrical fuel pellet) is inserted.

A new concept of fuel rod is annular type which is internally and externally cooled nuclear fuel rods.

The pellet of each annular nuclear fuel rod has a low peak temperature due to a thinner pellet thickness and a wider heat transfer area, and thus a relatively higher safety margin, as compared to that of each cylindrical nuclear fuel rod.

Figure 1:
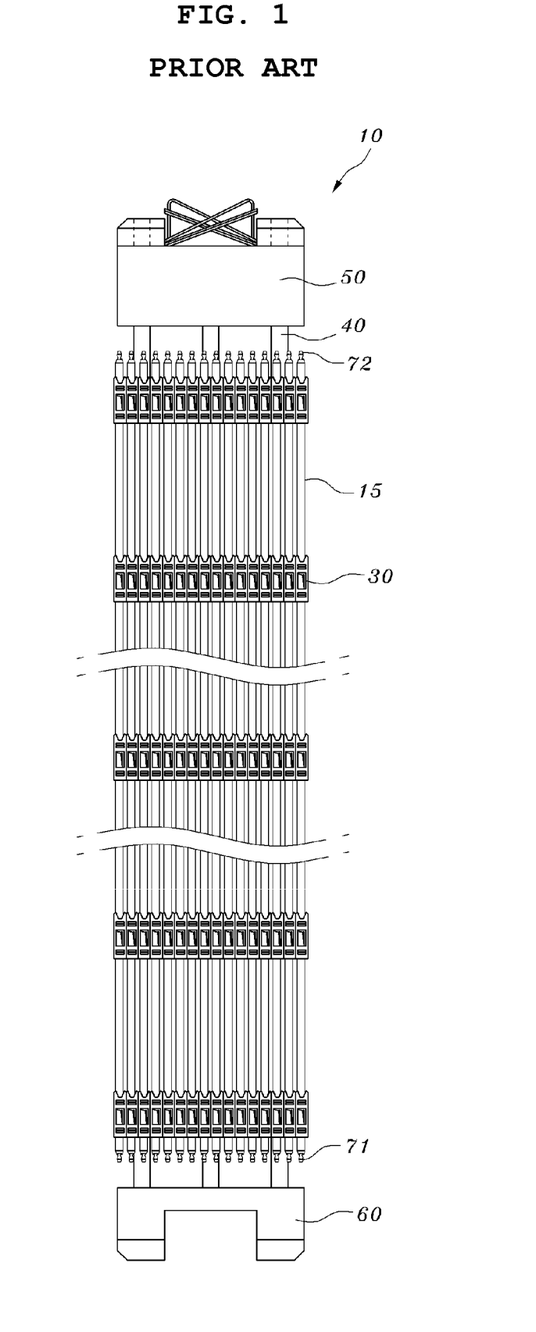
FIG. 1 is a schematic front view illustrating a conventional cylindrical nuclear fuel assembly.
Figure 2:
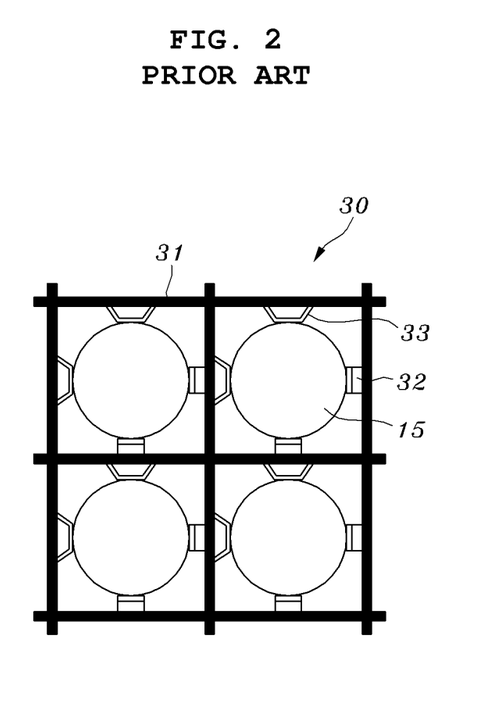
FIG. 2 is a schematic top plan view illustrating the configuration in which nuclear fuel rods of the cylindrical nuclear fuel assembly of FIG. 1 are supported by spacer grids.
Figure 3:
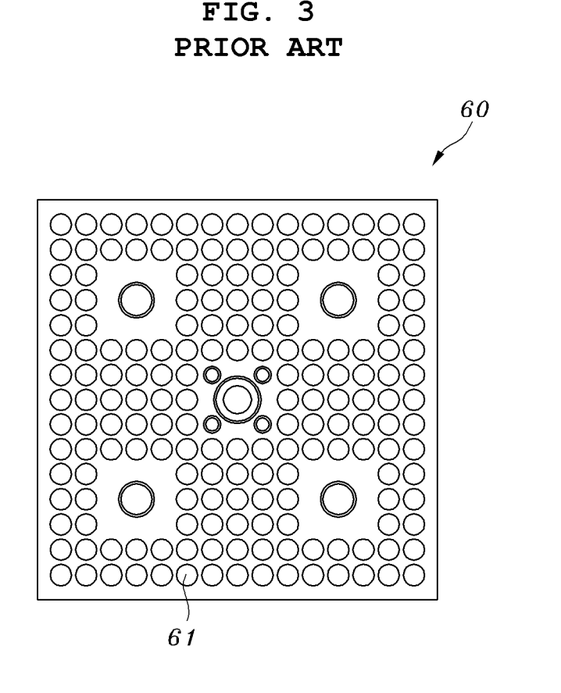
FIG. 3 is a schematic top plan view illustrating a bottom end piece of the cylindrical nuclear fuel assembly of FIG. 1.

FIG. 1 is a schematic front view illustrating a conventional cylindrical nuclear fuel assembly. FIG. 2 is a schematic top plan view illustrating the configuration in which nuclear fuel rods of the cylindrical nuclear fuel assembly of FIG. 1 are supported by spacer grids. FIG. 3 is a schematic top plan view illustrating a bottom end piece of the cylindrical nuclear fuel assembly of FIG. 1.

Referring to FIG. 1, the nuclear fuel assembly 10 includes nuclear fuel rods 15, spacer grids 30, guide thimbles 40, a top end piece 50 and a bottom end piece 60.

Each nuclear fuel rod 15 has a structure in which an uranium sintered pellet or a fuel pellet (not shown) generating high heat through nuclear fission is enclosed by a zirconium alloy cladding tube (not shown).

Each nuclear fuel rod 15 has lower and upper end plugs 71 and 72 which plug up the lower and upper portions thereof so as to prevent the fusion gas filled between the cladding tubes from leaking out.

Referring to FIG. 2, each spacer grid 30 has a plurality of rectangular grid straps 31, each of which has a spring 32 and dimples 33. Each nuclear fuel rod 15 is inserted into each spacer grid 30, and is contacted and supported by the spring 32 and dimples 33 of each grid strap 31.

Each dimple 33 has a strong elasticity, while the spring has a weaker elasticity than a dimple 33. The strong elasticity of the dimple 33 keeps the nuclear fuel rod 15 positioned in a transverse direction, and the weak elasticity of the spring 32 provides a supporting force to the nuclear fuel rod 15.

The guide thimbles 40 are arranged in the nuclear fuel assembly, and provide moving passages for the control rods (not shown).

The top end piece 50 and the bottom end piece 60 fix and support the nuclear fuel assembly 10 to and on the upper and lower structures of a core (not shown).

Referring to FIG. 3, the bottom end piece 60 has the shape of a porous plate in which a plurality of flow holes 61 is regularly formed. The coolant is supplied to the spaces between the nuclear fuel rods 15 through the flow holes 61.

Figure 4:
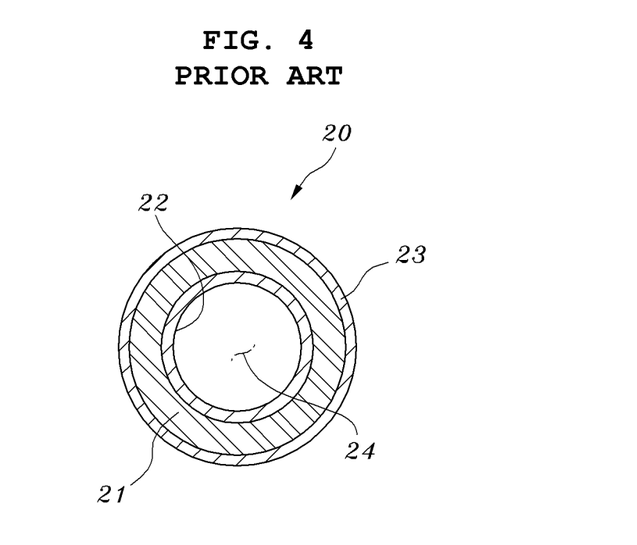
FIG. 4 is a schematic cross-sectional view illustrating an annular nuclear fuel rod.
Figure 5:
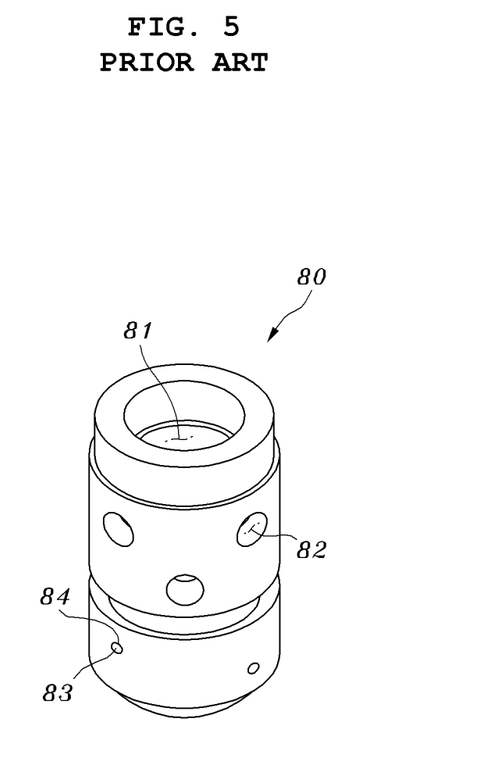
FIG. 5 is a schematic perspective view illustrating a lower end plug that can be applied to an annular nuclear fuel rod.
Figure 6:
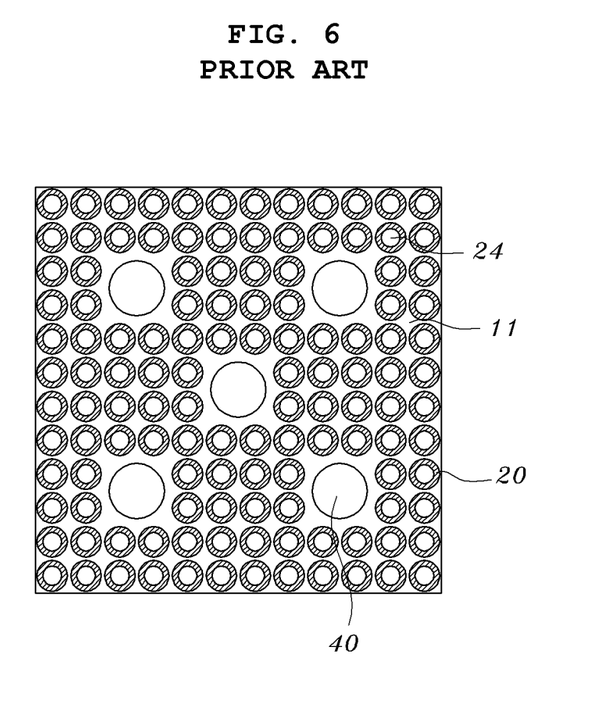
FIG. 6 is a schematic cross-sectional view illustrating the arrangement of the annular nuclear fuel rods of FIG. 4.

FIG. 4 is a schematic cross-sectional view illustrating an annular nuclear fuel rod. FIG. 5 is a schematic perspective view illustrating a lower end plug that can be applied to an annular nuclear fuel rod. FIG. 6 is a schematic cross-sectional view illustrating the arrangement of the annular nuclear fuel rods of FIG. 4.

Referring to FIG. 4, the annular nuclear fuel rod 20 includes an annular fuel pellet 21 generating high-temperature heat by means of nuclear fission, an inner cladding tube 22 coupled to an inner circumference of the fuel pellet 21, and an outer cladding tube 23 coupled to an outer circumference of the fuel pellet 21.

An inner space of the fuel pellet 21 acts as an inner channel 24 through which the coolant for cooling the high-temperature fuel pellet 21 flows.

The annular nuclear fuel rod 20 is coupled with upper and lower end plugs 70 and 80 at the upper and lower ends thereof, so that the fusion gas filled between the cladding tubes 22 and 23 of the annular nuclear fuel rod 20 is prevented from leaking out.

Referring to FIG. 5, the lower end plug 80 has the shape of a hollow cylinder or a hollow pipe in which a space 81 (hereinafter, referred to as "main hole") is formed. The lower end plug 80 is provided with a plurality of inflow holes 82 in an upper wall thereof, and a plurality of fastening holes 83 in a lower wall thereof. A filter pin 84 is inserted into each fastening hole 83 in a criss-cross shape so as to prevent debris from flowing into the main hole 81.

Referring to FIG. 6, spaces between the guide thimbles 40 and the annular nuclear fuel rods 20 are sub-channels 11. The coolant for cooling the high-temperature heat generated from the annular nuclear fuel rods 20 flows in a transverse direction and in a longitudinal direction, too.

The transverse direction refers to a direction perpendicular to an axis of each annular nuclear fuel rod 20.

The transverse flow of the coolant is determined by the ratio (G/P) of a gap G to a pitch P between the annular nuclear fuel rods 20. When the ratio is great, the transverse flow resistance of the coolant is small. In contrast, when the ratio is small, the transverse flow resistance of the coolant is great.

Hereinafter, only the nuclear fuel assembly to which the annular nuclear fuel rods 20 are applied will be described.

The nuclear fuel assembly 10 having the aforementioned structure generally burns for three cycles in the core of the nuclear reactor. Each spring 32 of the spacer grid 30 is subjected to a change in its mechanical properties by radiation exposure with a lapse of two cycles, so that it loses its elastic force.

When not supported by the spring 32, each annular nuclear fuel rod 20 falls down due to its weight until it settles on the bottom end piece 60, which is called a "bottoming" phenomenon.

When this "bottoming" phenomenon occurs, the main hole 81 of the lower end plug 80 can be blocked by the bottom end piece 60. Thus, the coolant may not flow into the main hole 81 of the lower end plug 80, but only into the inflow holes 82 formed in the upper wall of the lower end plug 80.

Since the inflow holes 82 are formed in the upper wall of the lower end plug 80 which is perpendicular to the direction in which the coolant flows, high flow resistance is occurred. For this reason, the flow rate of the coolant that flows into the inner space, i.e. the inner channel 24 of each annular nuclear fuel rod 20 may be reduced, so that the cooling capability in the inner channel can be reduced.

Further, the nuclear fuel assembly 10 composed by the annular nuclear fuel rods 20 has a narrower gap and a greater outer diameter, as compared to that composed by the cylindrical nuclear fuel rods 15. As such, the transverse flow resistance is increased relatively, so that it is difficult for the coolant to flow between the neighboring sub-channels in a transverse direction.

SUMMARY OF THE INVENTION

Accordingly, the present invention has been made by keeping in mind the above problems occurring in the related art, and embodiments of the present invention provide a lower end plug for an annular nuclear fuel rod, which can improve the cooling capability of a coolant with respect to the annular nuclear fuel rod.

According to each individual aspect of the present invention, a lower end plug for an annular nuclear fuel rod is provided. The lower end plug comprises: a support with a great slenderness ratio; a coolant inflow part with an inner inflow space and a plurality of inflow holes in a wall thereof so as to interact with the inflow space, coupled to a lower end of the annular nuclear fuel rod at an upper end thereof, and extending from an upper end of the support in a reverse conical shape such that the inflow space interact with an inner channel of the annular nuclear fuel rod; and a coupler extending from a lower end of the support and coupled with a handling tool of the annular nuclear fuel rod.

In an embodiment of the present invention, the coolant inflow part may be configured so that a cylindrical pipe is coupled to an upper end thereof.

In an embodiment of the present invention, the slenderness ratio of the support is in the range of 1 to 20.

In another embodiment of the present invention, each of the inflow holes may be inclined in such a manner that an outer end thereof exposed outwards is located lower than an inner end thereof exposed inwards.

In another embodiment of the present invention, each of the inflow holes may be formed perpendicular to the wall of the coolant inflow part.

In another embodiment of the present invention, the inflow holes may have a sum of their cross sections greater than a cross section of the inner channel of the annular nuclear fuel rod.

In another embodiment of the present invention, the inflow holes may be formed in at least one row.

In another embodiment of the present invention, each of the inflow holes may have a circular shape or an oval shape.

In another embodiment of the present invention, each of the inflow holes may have a diameter smaller than that of the inner channel of the annular nuclear fuel rod so as to prevent debris from entering the inner channel of the annular nuclear fuel rod.

In another embodiment of the present invention, the support may have the shape of a solid rod in order to maintain its strength.

In another embodiment of the present invention, the coupler may be inclined in such a manner that a diameter thereof is gradually reduced in a downward direction.

According to these embodiments of the present invention, the lower end plug for the annular nuclear fuel rod is configured so that the coolant inflow part is formed in a reverse conical shape, and is further provided with a plurality of inclined inflow holes in a wall thereof, so that a sum of their cross sections of the inflow holes is greater than a cross section of the inner channel of the annular nuclear fuel rod.

Thus, although a bottoming phenomenon of the annular nuclear fuel rod occurs, a coolant can be supplied to the inner channel of the annular nuclear fuel rod through the inflow holes of the lower end plug, so that the cooling capability of the annular nuclear fuel rods can be maintained uniformly.

The support is formed to have a great slenderness ratio and a rod shape in order to maintain its strength, thereby increasing the transverse channel of the coolant to improve the transverse flow of the coolant between neighboring sub-channels.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to an exemplary embodiment of the invention with reference to the accompanying drawings.

Figure 7:
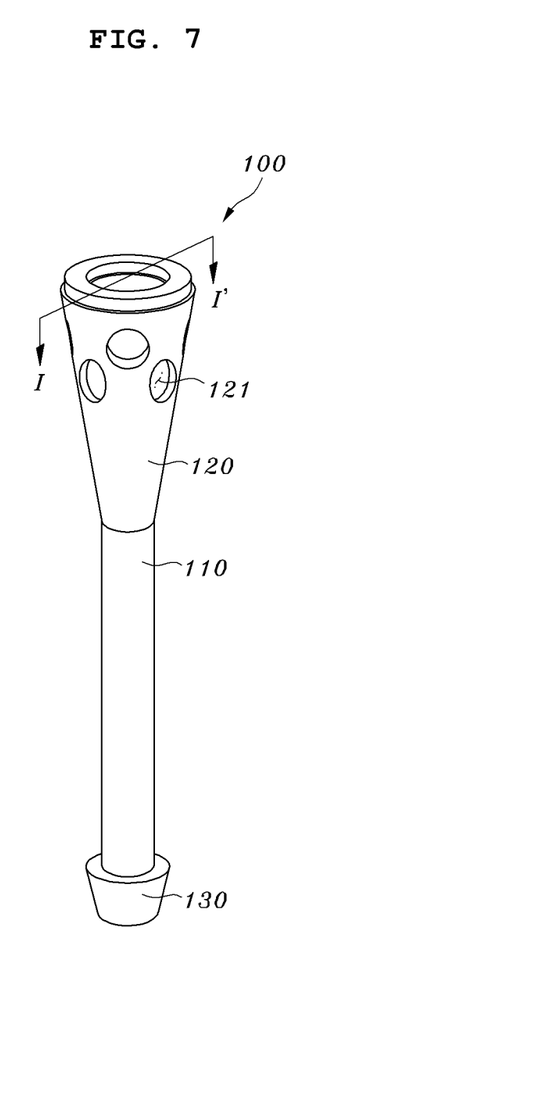
FIG. 7 is a schematic perspective view illustrating a lower end plug for an annular nuclear fuel rod according to an embodiment of the present invention.
Figure 8:
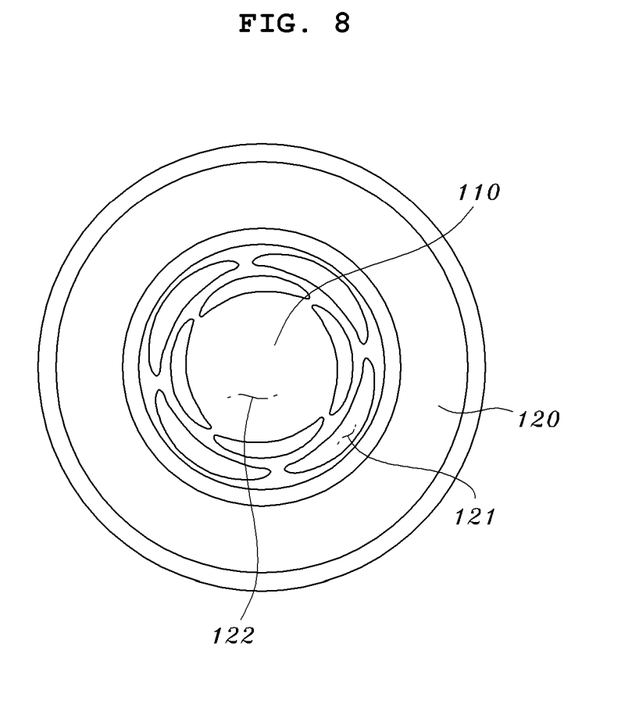
FIG. 8 is a schematic top plan view illustrating a lower end plug of FIG. 7.
Figure 9:
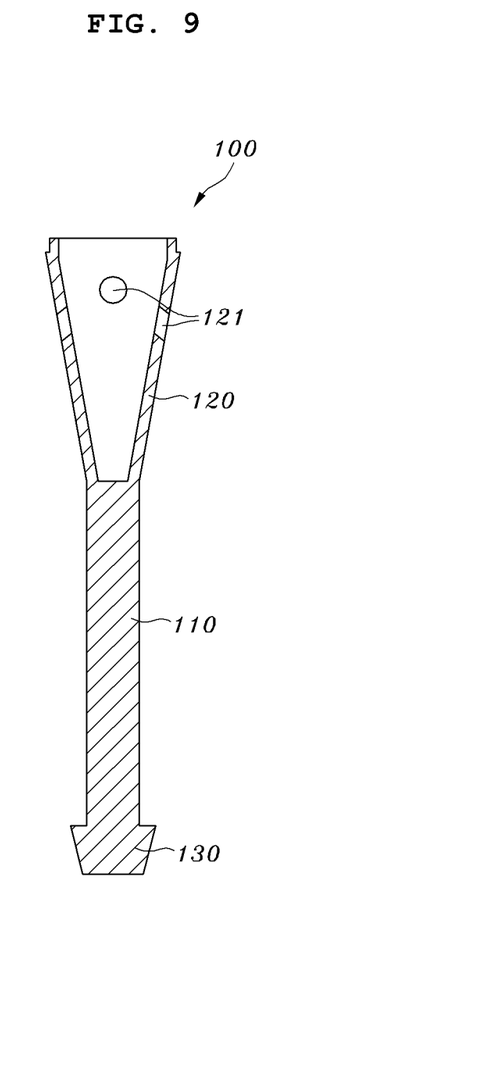
FIG. 9 is a schematic sectional view taken along line I-I' of FIG. 7.
Figure 10:
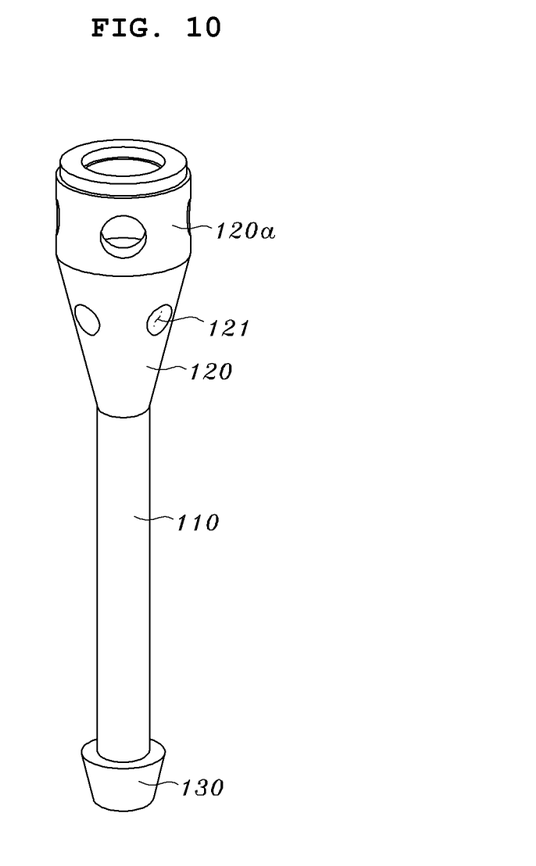
FIG. 10 is a schematic perspective view illustrating a modification of the lower end plug of FIG. 7.
Figure 11:
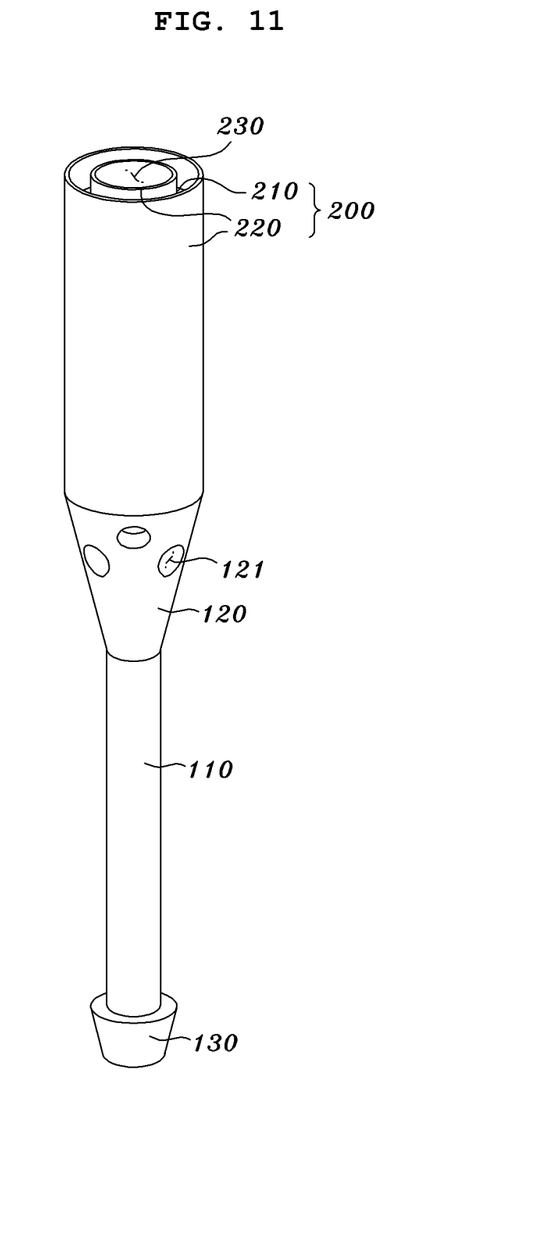
FIG. 11 is a schematic perspective view illustrating the state in which the lower end plug of FIG. 7 is coupled to the annular nuclear fuel rod.

FIG. 7 is a schematic perspective view illustrating a lower end plug for an annular nuclear fuel rod according to an embodiment of the present invention. FIG. 8 is a schematic top plan view illustrating the lower end plug of FIG. 7. FIG. 9 is a schematic sectional view taken along line I-I' of FIG. 7. FIG. 10 is a schematic perspective view illustrating a modification of the lower end plug of FIG. 7. FIG. 11 is a schematic perspective view illustrating the state in which the lower end plug of FIG. 7 is coupled to the annular nuclear fuel rod.

Referring to FIGS. 7 through 11, the annular nuclear fuel rod 200 includes an inner cladding tube 210 and an outer cladding tube 220, and an annular pellet (or an annular sintered pellet) interposed between the inner cladding tube 210 and the outer cladding tube 220. An inner hollow space of the inner cladding tube 210 acts as the inner channel 230 for a coolant.

The lower end plug 100 is coupled to a lower end of the annular nuclear fuel rod 200, and includes a support 110, a coolant inflow part 120, and a coupler 130.

The support 110 has the shape of a rod, which has a great slenderness ratio and has the shape of a solid rod in order to maintain its strength.

The support 110 with a great slenderness ratio increases the transverse channel as compared to a conventional lower end plug, thereby facilitating in a transverse flow of the coolant between neighboring sub-channels (not shown), each of which is formed between the annular nuclear fuel rods 200. Preferably, the slenderness ratio of the support 110 is in the range of 1 to 20.

The coolant inflow part 120 extends from an upper end of the support 110, and has a reverse conical shape.

In other words, when the coolant inflow part 120 and the support 110 are combined with each other, their combination has the shape of a funnel.

Alternatively, the coolant inflow part 120 may have a structure in which a cylindrical pipe 120a with an inner space is additionally coupled to an upper end thereof.

The coolant inflow part 120 is provided therein with a conical inflow space 122. Further, the coolant inflow part 120 includes a plurality of inflow holes 121 in a wall thereof so as to interact with the inflow space 122.

In the structure in which the pipe 120a with the inner space is additionally coupled to the upper end of the coolant inflow part 120, the pipe 120a is provided with a plurality of inflow holes 121 in a wall thereof.

The upper end of the coolant inflow part 120 can be coupled to the lower end of the annular nuclear fuel rod 200 such that the inflow space 122 thereof can interact with the inner channel 230 of the annular nuclear fuel rod 200.

The inflow holes 121 of the coolant inflow part 120 are passages into which the coolant flows, and can be inclined with respect to the wall of the coolant inflow part 120 at a predetermined angle.

In contrast to this configuration, the inflow holes formed in the upright upper wall of the conventional lower end plug are located perpendicular to the upright upper wall of the conventional lower end plug.

Each inflow hole 121 can be inclined in such a manner that the outer end thereof exposed outwards is located lower than the inner end thereof exposed inwards; that is, has an upward inclination from the outer end to the inner end thereof.

The predetermined angle of each inflow hole 121 can be a right angle, i.e., be formed perpendicular to the wall of the coolant inflow part 120.

As described above, when inclined at a predetermined angle, each inflow hole 121 reduces the resultant resistance when the coolant flows in a transverse direction, so that the inflow of the coolant can be improved.

Each inflow hole 121 can be formed in a circular shape or in an oval shape, and in a row or in rows.

The sum of the cross sections of the inflow holes 121 can be greater than a cross section of the inner channel 230 of the annular nuclear fuel rod 200.

With this configuration, the amount of coolant flowing into the inner channel 230 of the annular nuclear fuel rod 200 is increased to improve its cooling capability.

Each inflow hole 121 can have a diameter smaller than that of the inner channel 230 of the annular nuclear fuel rod 200. With this configuration, it is possible to prevent external debris from entering the inner channel 230 of the annular nuclear fuel rod 200.

As a result, it is unnecessary to install a filtering device as in the prior art.

The coupler 130 extends from a lower end of the support 110, and can be coupled with a handling tool (not shown) of the annular nuclear fuel rod 200.

The coupler 130 is inclined in such a manner that a diameter thereof is gradually reduced in a downward direction.

This coupler 130 facilitates in coupling the handling tool of the annular nuclear fuel rod 200 which is used to load the annular nuclear fuel rod 200 into the spacer grid (not shown) when the nuclear fuel assembly (not shown) is assembled.

As described above, the lower end plug 100 includes the support 110 with a great slenderness ratio, thereby increasing the transverse channel of the coolant to improve the transverse flow of the coolant.

The coolant inflow part 120 has a reverse conical shape, and includes the inclined inflow holes 121 in the wall thereof and the inflow space 122 in the inside thereof. Thus, the coolant can flow into the inflow space 122 through the inflow holes 121, and then be supplied to the inner channel 230 of the annular nuclear fuel rod 200.

As disclosed in the "Description of the Related Art" section, each annular nuclear fuel rod 20 suffers from the "bottoming" phenomenon in which it is not elastically supported by the springs of the spacer grid and thus settles on the bottom end piece, so that the lower end plug 80 thereof comes into contact with the bottom end piece (not shown). As a result, the coolant is partially supplied to the inner channel 24 of each annular nuclear fuel rod 20.

In the case in which this "bottoming" phenomenon occurs, the main hole of the lower end plug 80 into which the coolant flows for the most part is blocked. Thus, the lower end plug 80 reduces the supply of the coolant to the inner channel of each annular nuclear fuel rod 20. According to an embodiment of the present invention, despite the "bottoming" phenomenon, the lower end plug 100 does not influence the supply of the coolant.

Further, the diameter of each inflow hole 121 of the coolant inflow part 120 is smaller than that of the inner channel 230 of each annular nuclear fuel rod 200, so that any external debris can be filtered effectively.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A lower end plug for an internally and externally-cooled annular nuclear fuel rod comprising:
    a support with a slenderness ratio in the range of 1 to 20;
    a coolant inflow part with an inner inflow space and a plurality of inflow holes in a wall thereof, so as to interact with the inflow space, coupled to a lower end of the internally and externally-cooled annular nuclear fuel rod at an upper end thereof, and extending from an upper end of the support in a reverse conical shape such that the inflow space interacts with an inner channel of the internally and externally-cooled annular nuclear fuel rod; and
    a coupler extending from a lower end of the support and coupled with a handling tool of the internally and externally-cooled annular nuclear fuel rod,
wherein each of the inflow holes is inclined in such a manner that an outer end thereof, exposed outwards, is located lower than an inner end thereof, exposed inwards.

2. The lower end plug as set forth in claim 1, wherein each of the normal lines of faces that the outer end and the inner end of inflow holes form is formed perpendicular to the wall of the coolant inflow part.

* * * * *